United States Patent
Grady (10) Patent No.: US 7,672,511 B2
(45) Date of Patent: *Mar. 2, 2010

(54) SYSTEM AND METHOD FOR LATTICE-PRESERVING MULTIGRID METHOD FOR IMAGE SEGMENTATION AND FILTERING

(75) Inventor: Leo Grady, Yardley, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 899 days.

This patent is subject to a terminal disclaimer.

(21) Appl. No.: 11/472,006

(22) Filed: Jun. 21, 2006

(65) Prior Publication Data

US 2007/0047810 A1    Mar. 1, 2007

Related U.S. Application Data (60) Provisional application No. 60/712,628, filed on Aug. 30, 2005.

(51) Int. Cl.
*G06K 9/34* (2006.01)
(52) U.S. Cl. .................................................... 382/173
(58) Field of Classification Search .................. 382/173
See application file for complete search history.

(56) References Cited

U.S. PATENT DOCUMENTS

2006/0147115 A1 * 7/2006 Grady .......................... 382/173

OTHER PUBLICATIONS

U.S. Appl. No. 11/205,729, filed Aug. 17, 2005.
U.S. Appl. No. 11/234,977, filed Sep. 26, 2005.
U.S. Appl. No. 11/374,741, filed Mar. 14, 2006.

* cited by examiner

*Primary Examiner*—Samir A. Ahmed
*Assistant Examiner*—Fred Hu
(74) *Attorney, Agent, or Firm*—Donald B. Paschburg; F. Chau & Associates, LLC (57) ABSTRACT

A method for segmenting a digitized image includes providing a digitized image comprising a plurality of intensities corresponding to a domain of points on an N-dimensional grid, defining a weight between each pair of adjacent points in the image based on the intensity difference of each said point pair, marking a subset of points in said image wherein each marked point is marked with one of a plurality of labels, determining the probability that an unmarked point should be marked with one of said plurality of labels using a multigrid method that uses a restriction operator to map said provided image to a coarse-level gird, and a prolongation operator to map said coarse-level image back to a fine-level grid, wherein said restriction operator is an adjoint of said prolongation operator, and wherein a fine-level segmentation is a prolongation of a coarse level segmentation.

19 Claims, 5 Drawing Sheets

SYSTEM AND METHOD FOR LATTICE-PRESERVING MULTIGRID METHOD FOR IMAGE SEGMENTATION AND FILTERING

CROSS REFERENCE TO RELATED UNITED STATES APPLICATIONS

This application claims priority from "A LATTICE-PRESERVING MULTIGRID METHOD FOR SOLVING INHOMOGENEOUS DIRICHLET PROBLEMS, WITH APPLICATIONS TO IMAGE SEGMENTATION AND FILTERING", U.S. Provisional Application No. 60/712,628 of Leo Grady, filed Aug. 30, 2005, the contents of which are incorporated herein by reference.

TECHNICAL FIELD

This invention is directed to automated and semi-automated segmentation, filtration, and colorization of digitized images.

DISCUSSION OF THE RELATED ART

The solution of the inhomogeneous Laplace (Poisson) equation with internal Dirichlet boundary conditions has recently appeared in several applications, ranging from image segmentation to image colorization, digital photo editing and image filtering, including the now-classic anisotropic diffusion problem. Although these algorithms are framed in a discrete (graph) setting, they have been almost exclusively employed in a rectilinear coordinate system that results in the use of a (widely) banded Laplacian matrix. Unfortunately, despite the banded structure of the matrix representing the Laplacian on a grid, traditional fast Laplace/Poisson solvers are inappropriate, due to the inhomogeneity of the partial differential equation (PDE) coefficients. In contrast, a similar approach that employs uniform coefficients is able to take advantage of fast solvers. Design of an efficient multigrid solver is difficult for these problems due to unpredictable inhomogeneity in the equation coefficients and internal Dirichlet conditions with unpredictable location and value. Previous approaches to design a multigrid solver have relied on unmotivated heuristics to produce coarse-level operators.

A previous multigrid approach was applied to the similar problem of anisotropic diffusion, which also requires solving a system of equations with an inhomogeneous Laplacian. However, this approach employed a simple injection restriction operator and a traditional interpolation prolongation method to prevent smoothing/restriction across edge boundaries. Previous disclosures by this inventor have addresses these issues through the design of a multigrid algorithm. In one case, the coarse level operator is an approximation of the electrical effective conductance between two nodes at the fine level. In another, a weighted bilinear approach is used, which produces a coarse operator by applying the restriction operator directly to the (n−1)×n matrix of weights, as if it were an image. However, it is unclear what these approaches represent on the coarse level. The relationship between the coarse-level operator and the restriction/prolongation operator is unclear, and these approaches can lead to unstable or poor convergence.

SUMMARY OF THE INVENTION

Exemplary embodiments of the invention as described herein generally include methods and systems for multigrid approaches for solving the inhomogeneous Laplace (Poisson) equation with internal Dirichlet boundary conditions. A maximally connected neighbor coarsening strategy for designing a restriction operator yields prolongation and coarse-level operator via a Galerkin construction. This coarse level operator produces a graph Laplacian on a coarse lattice, allowing efficient data structures. Such an approach has the advantage that it is principled, makes use of the weight structure (image data) and can preserve a lattice structure at higher levels (in both 2D and 3D). A MCN-based restriction/prolongation operators according to an embodiment of the invention provides a more principled approach wherein the operators are adjoint to each other and that the coarse-level operator is matched to the prolongation/restriction schemes.

According to an aspect of the invention, there is provided a method for segmenting a digitized image, including providing a digitized image comprising a plurality of intensities corresponding to a domain of points on an N-dimensional grid, defining a weight between each pair of adjacent points in the image based on the intensity difference of each said point pair, marking a subset of points in said image wherein each marked point is marked with one of a plurality of labels, determining the probability that an unmarked point should be marked with one of said plurality of labels using a multigrid method that uses a restriction operator to map said provided image to a coarse-level gird, and a prolongation operator to map said coarse-level image back to a fine-level grid, wherein said restriction operator is an adjoint of said prolongation operator, and wherein a fine-level segmentation is a prolongation of a coarse level segmentation.

According to a further aspect of the invention, the prolongation operator is $$P_{v_i c_j} = \begin{cases} 1 & \text{if } v_i = c_j, \\ 1 & \text{if } c_i \text{ is the MCN of } v_j, \\ 0 & \text{otherwise.} \end{cases}$$

wherein $v_i$ is a point on said image, $c_j$ is a point on said coarse level grid image, and a most strongly connected neighbor of a point is an adjacent point having a largest weight between said pair of points.

According to a further aspect of the invention, the multigrid method comprises calculating an approximate solution to said probabilities on a fine level grid starting from said provided image, calculating a residual to the solution, restricting the residual to said coarse level grid with said restriction operator, calculating a correction for the residual on the coarse level grid, and correcting the approximate solution on said fine level grid with a prolongated correction using said prolongation operator.

According to a further aspect of the invention, the method comprises representing said image by a Laplacian matrix L indexed by point pairs, wherein an element $L_{ij}$ for points i and j is defined by $$L_{ij} = \begin{cases} d_i & \text{if } i = j, \\ -w_{ij} & \text{if } v_i \text{ and } v_j \text{ are adjacent nodes}, \\ 0 & \text{otherwise} \end{cases}$$

wherein $w_{ij}$ is said weight associated with adjacent pairs of points and $d_i = \Sigma w_{ij}$ for all weights incident on point i, decomposing L as $$L = \begin{bmatrix} L_M & B \\ B^T & L_U \end{bmatrix},$$

wherein $L_M$ is the Laplacian for the marked points, $L_U$ is the Laplacian for the unmarked points, and B comprises those elements of L that are left over, representing the probability for each unmarked point i with respect to a marked point s by $x_i^s$, said unmarked probabilities forming a vector $x_U$, wherein the probabilities for each unmarked point can be determined by solving $L_U x_U = b$, wherein b is a function.

According to a further aspect of the invention, each said weight $w_{ij}$ between a point $v_i$ adjacent to point $v_j$ on a fine level grid is determined by $$w_{ij} = \exp(-\beta(g_i - g_j)^2),$$

where $g_i$ and $g_j$ are the intensities of points i and j, respectively, and $\beta$ is a free parameter.

According to a further aspect of the invention, the weight between two adjacent coarse nodes $v_i$, $v_j$ on a coarse level grid includes a term proportional to $$w_{ij} = \sum_{M*(v_s) = v_i, M*(v_q) = v_j, \forall v_s, v_j} w_{sq}$$

wherein $w_{sq}$ is the weight between fine level grid points $v_s$, $v_q$, the operator $$M*(v_i \in N^k) = v_j \in N^0$$

produces a coarse node from k applications of operator $$M(v_i \in N^k) = v_j \in N^{k-1}$$

that maps each neighbor point in $N^k$ to its maximally connected neighbor point, and wherein $N^k$ is a set of points wherein a number of odd digits in a coordinate of each said point is equal to k and $N^0$ is the coarse level grid.

According to a further aspect of the invention, the probability that an unmarked point is be marked with one of said plurality of labels is determined by an initial linear system $$Lx^f = b^f,$$

wherein L is a Laplacian matrix with a fine-level probability solution, $x^f$ and fine-level grid function $b^f$, and said coarse level grid linear system is $$P^T L P x^c = P^T b^c,$$

wherein P is a prolongation operator, $P^T$ is a restriction operator, and $x^c$ and $b^c$ are coarse level probability solutions and functions.

According to a further aspect of the invention, coarsening said image with said restriction operator further comprises assigning each $k^{th}$-order neighbor of a point in an object to be segmented the same label on a fine-level grid as its most strongly connected $(k-1)^{th}$-order neighbor point, and assigning a $k^{th}$-order neighbor of a point in an object to be segmented that is equally connected to multiple $(k-1)^{th}$-order neighbors the label of any one of these neighbors, wherein a point belongs to a $k^{th}$ order set if a number of odd digits in its coordinates are equal to k.

According to another aspect of the invention, there is provided a program storage device readable by a computer, tangibly embodying a program of instructions executable by the computer to perform the method steps for segmenting a digitized image.

DETAILED DESCRIPTION OF THE PREFERRED EMBODIMENTS

Exemplary embodiments of the invention as described herein generally include systems and methods for applying a multigrid solver to the inhomogeneous Laplace (Poisson) equation with internal Dirichlet boundary conditions. Given knowledge at certain pixels, termed seeds, of a certain quantity of interest, such as object labels, grayscale intensities, or colors, assign appropriate quantities to the unlabeled pixels that reflect the spatial structure of the image. The seed pixels are then set as Dirichlet boundary conditions (despite being internal to the domain), the pixel intensities are allowed to define the coefficients (weights) and the Laplace (or Poisson) equation is solved to find the quantities at the unlabeled nodes. This approach respects weak (or absent) object boundaries, has provable robustness to noise and admits interpretation in the context of a random walk in the domain.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Discrete Laplacians

The language of graph theory is suitable for problems formulated on a discrete space, such as a digitized image. A graph is a pair G=(V;E) with vertices (nodes) v∈V and edges e∈E⊆V×V. An edge, e, spanning two vertices, $v_i$ and $v_j$, is denoted by $e_{ij}$. A weighted graph assigns a value to each edge called a weight. The weight of an edge, $e_{ij}$, is denoted by $w(e_{ij})$ or $w_{ij}$. The degree of a vertex is $d_i=\Sigma w(e_{ij})$ for all edges $e_{ij}$ incident on $v_i$. In the context of 2D (3D) image processing, the graph nodes are taken as the image pixels (voxels), which lie on a rectangular, 4-connected, (8-connected) grid. Graph partitioning assigns each node to a set of foreground voxels, F, or background voxels, B, such that F∪B=V, F∩B=∅. For expository purposes, attention will be restricted to 4- or 8-connected lattices in 2D and 6-, 10- or 26-connected lattices in 3D.

A discrete graph Laplacian matrix can be defined as $$L_{v_iv_j} = \begin{cases} d_{v_i} & \text{if } i = j, \\ -w_{ij} & \text{if } v_i \text{ and } v_j \text{ are adjacent nodes}, \\ 0 & \text{otherwise} \end{cases}$$

where $L_{v_iv_j}$ is used to indicate that the matrix L is indexed by vertices $v_i$ and $v_j$. The weights $w_{ij}$ can be defined in terms of image intensities through many different methods. One exemplary, non-limiting weighting function is the Gaussian weighting function given by $w_{ij}=\exp(-\beta(g_i-g_j)^2)$, where $g_i$ indicates the image intensity at pixel i. The value of β is a free parameter. Another possible weighting function would maximize the entropy of the resulting weights.

Given a set of marked pixels subject to Dirichlet boundary conditions, where the pixels can be marked either interactively or automatically, the vertices can be partitioned into two disjoint sets, $V_M$ (marked/seed nodes) and $V_U$ (unmarked nodes) such that $V_M \cup V_U=V$ and $V_M \cap V_U=\emptyset$. The Laplacian can then be decomposed and reordered into the form $$L = \begin{bmatrix} L_M & B \\ B^T & L_U \end{bmatrix},$$

corresponding to the marked/unmarked sets. Here, $L_U$ is the Laplacian for the unmarked nodes, $L_M$ is the Laplacian for the marked nodes, and B (and its transpose $B_T$) comprise those elements of L that are left over. Fixing some of the nodes as "boundary" nodes results in their removal from the Laplacian matrix and incorporation into the right hand side. This formulation can be reduced to solving $$L_U x_U = b,$$

for $x_U$ in the presence of some right hand side, b, that depends on the application. The quantities $x_U$ represent the probabilities that an unmarked voxel is a member of one of the labeled sets.

Multigrid Methods

Multigrid methods have been shown to be extremely successful at solving systems of equations that arise in the solution of partial differential equations (PDEs), by solving these systems with linear complexity. In general, there are two branches of the method: geometric and algebraic. Algebraic multigrid methods aspire to a "black box" method that can apply the technique to an arbitrary linear system. In contrast, geometric methods evolved out of attempts to solve PDEs on a rectilinear domain, especially elliptic and parabolic systems, where it may be assumed that coarsened versions of the operator also represent rectilinear grids. In a method according to an embodiment of the invention, a hybrid geometric/algebraic technique is pursued that makes use of the fact that the system of equations has a geometric structure, but also takes into account the varying coefficients of the matrix.

Standard relaxation methods, such as Jacobi iteration or Gauss-Siedel relaxation, have been shown to perform well in correcting high-frequency error. However, low-frequency error requires an excessive number of iterations to produce convergence with these methods. Multigrid methods work by producing a correction of the current solution that is derived from a coarsened form of the system. The idea is that the coarse-grid updates correct low-frequency errors, while fine grid relaxations correct high-frequency errors. In order to produce the coarse grid correction, the multigrid method is applied recursively, forming what is known as a V-cycle, described by the following steps. Denote the relaxation iterations parameter by v, the residual vector with r, the current (intermediate) solution at level k as $x^k$, the coarsened operator at level k as $L^k$, the restriction operator as R, and the prolongation operator as P. Since the prolongation/restriction operators are linear, they can be viewed as matrices. Starting with k=0, the multigrid method may be described in pseudocode as
1. multigrid (L, x, f)
2. While not converged to tolerance
3. Relax $L^0 x^0 = f^0$ with v iterations (relaxation)
4. $r^0 = f - L^0 x^0$ (compute the residual)
5. $r^1 = R r^0$ (restrict the residual)
6. c=0 (initialize the correction to zero)
7. multigrid recursion (1, c, $r^1$)
8. $x^k = x^k + PC$
(update the solution with the prolongated correction)

where the recursive function is defined by:
1. multigrid recursion (k, y, d)
2. If k=$k_{MAX}$
   solve $L^k y = d$ exactly
3. Else
4. Relax $L^k y^k = d^k$ with v iterations (relaxation)
5. $r^k = d^k - L^k y^k$ (compute the residual)
6. $r^{k+1} = Rr$ (restrict the residual)
7. c=0 (initialize the correction to zero)
8. multigrid recursion (k+1, c, $r^{k+1}$) (continue recursion)
9. $y^k = y^k + Pc$
(update the solution with the prolongated correction)

Given the above formalism, the main issues that must be addressed in order to design a multigrid method are: (1) specifying the restriction operator; (2) specifying the prolongation operator; and (3) producing a coarsened operator. The restriction operator can be specified as an injection and the prolongation operator as a "traditional interpolation". The image is resampled and the coefficients are recomputed. These operators may work well enough for calculating a few iterations of diffusion, but do not offer rapid convergence for the steady-state (i.e., elliptical) equations. One reason for this is that the weight structure of the image may not be taken into account in the operator design. There is also a theoretical foundation for requiring that the prolongation and restriction operators be adjoint to each other. To review, two operators, A and A*, are adjoint if $$\langle Ax, y \rangle = \langle x, A^*y \rangle$$

is satisfied. For a finite, linear, operator, represented by matrix A, its adjoint is $A^* = A^T$.

MCN Multigrid

According to an embodiment of the invention, given an initial linear system $$Lx^f = b^f,$$

with a fine-level solution, $x^f$, right-hand side, $b^f$, and a prolongation operator, P, the principled restriction operator is the adjoint of P (the transpose, in the case of a linear operator) and a coarse-level system is given by $$P^T L P x^c = P^T b^c.$$

If P has only a single '1' entry on each row, then the coarse-level operator, $P^T L P$, represents the Laplacian of a coarse-level graph, where each node on the fine level node is subsumed into a large node on coarse-level. Such a prolongation/restriction operator is referred to as an agglomerative operator since it may be viewed as grouping together fine-level nodes. An agglomerative operator can guarantee that the coarse-level matrix is the Laplacian of a graph, and therefore the approach is guaranteed to be stable. In contrast, a coarse-level operator $P^T L P$ that uses weighted bilinear interpolation as the prolongation operator is not guaranteed to produce the Laplacian of some graph on the coarse level, and therefore exhibits instability if $P^T L P$ is used as the coarse operator.

According to an embodiment of the invention it is desired that an agglomerative operator include two properties: (1) coarse-level boundaries should correspond to image boundaries (i.e., the agglomeration should represent a loose pre-segmentation); and (2) the coarse-level topology should be regular, so that it may be represented efficiently.

A maximally-connected neighbor (MCN) coarsening represents such an operator, according to an embodiment of the invention. An MCN coarsening according to an embodiment of the invention can be defined as follows. On a lattice, first write each node in terms of its 2D or 3D coordinates (starting with (0, 0, 0) and moving in the positive directions. Define a node as belonging to the $k^{th}$ order distance set, $N^k \subset V$, if the number of odd digits in its coordinates are equal to k. The coarse sampling set may be viewed as $N^0$. In 2D, $(N^0 \cup N^1 \cup N^2) = V$, and in 3D, $(N^0 \cup N^1 \cup N^2 \cup N^3) = V$. A node in the $N^k$-th distance set will be referred to as a $k^{th}$-order neighbor of a coarse node.

Figure 1:
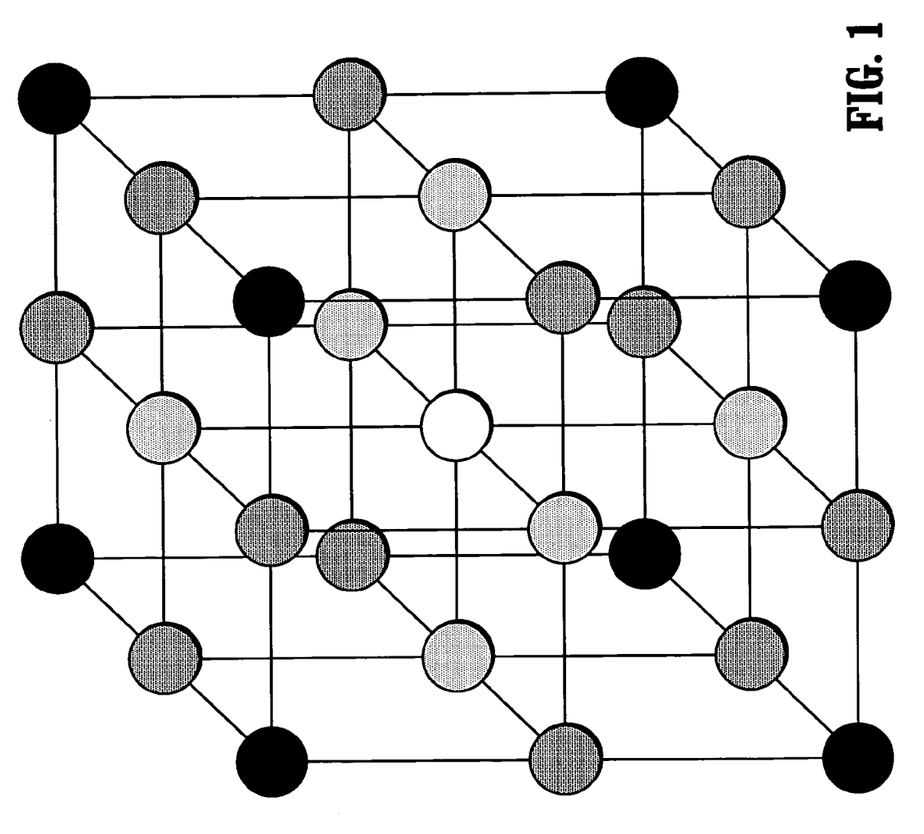
FIG. 1 illustrates coarse-lattice neighbors in a grid, according to an embodiment of the invention.

FIG. 1 illustrates coarse-lattice neighbors on a grid. The black nodes correspond to coarse-lattice samples, dark-gray nodes to $1^{st}$-order neighbors, light-gray nodes to $2^{nd}$-order neighbors and white nodes to $3^{rd}$-order neighbors. The Maximally Connected Neighbor rule states that a $1^{st}$-order neighbor takes the same label as its most strongly connected (i.e., weighted) coarse-lattice neighbor. Similarly, a $2^{nd}$-order neighbor takes the same label as its most strongly connected $1^{st}$-order neighbor and a $3^{rd}$-order neighbor takes the same label as its most strongly connected $2^{nd}$-order neighbor.

Note that iteratively coarsening a volume will eventually obscure the details of the object in question. The limit of coarsening the volume to a single voxel removes any image structure that was present initially. To this end, assume that coarsening continues while a segmentation target (i.e., object) satisfies the following conditions, referred to as the Maximally Connected Neighbor requirements:

1. Each $k^{th}$-order neighbor takes the same label on the fine lattice as its most strongly connected $(k-1)^{th}$-order neighbor.

2. If a $k^{th}$-order neighbor is equally connected to multiple $(k-1)^{th}$-order neighbors, it can take the label of any one of these neighbors.

By label is meant the decision that this voxel belongs to foreground or background. The most strongly connected $(k-1)^{th}$-order neighbor of a node is defined to be that neighbor for which the node has the largest edge weight connecting it. An MCN neighbor of a node refers to the most strongly connected $(k-1)^{th}$-order neighbor of a node. The most strongly connected neighbor of a node in $N^0$ is defined to be itself.

Given a set of coarse nodes, $c_i \in N^0$, an MCN prolongation operator can be defined as:

$$P_{v_i c_j} = \begin{cases} 1 & \text{if } v_i = c_j, \\ 1 & \text{if } c_i \text{ is the MCN of } v_j, \\ 0 & \text{otherwise.} \end{cases}$$

In the case of a tie for maximal neighbors of a node, $v_j$, described in the MCN conditions, a single '1' is placed in the $j^{th}$ column at a row corresponding to any one of its maximally connected neighbors. The MCN conditions on the object shape may now be written algebraically by requiring that the fine-level segmentation is simply a prolongation of the coarse-level segmentation:

$$Px^c = x.$$

This operator P is the agglomerative prolongation operator referred to above in the context of traditional multigrid approaches.

An agglomerative prolongation operator according to an embodiment of the invention preserves lattice structure. In 2D, a 4- or 8-connected lattice will become an 8-connected lattice on the coarse lattice and in 3D, a 6-, 10- or 26-connected lattice will become a 26-connected lattice on the coarse lattice. The benefit of this higher-level connectivity structure is that a standard, regular, data representation can be used for all levels (i.e., an 8-connected lattice in 2D and a 26-connected lattice in 3D).

The coarsened weighting is straightforward to implement, according to an embodiment of the invention. Define the operator $$M(v_i \in N^k) = v_j \in N^{k-1}$$

that maps each $k^{th}$-order neighbor node to its maximally connected neighbor and define $$M^*(v_i \in N^k) = v_j \in N^0$$

as the operator that produces a coarse node from k applications of M. Then, the weight between two coarse nodes on the upper-level graph is given by $$w_{ij} = \sum_{M^*(v_s) = v_i, M^*(v_q) = v_j, \forall v_s, v_j} w_{sq}.$$

Figure 2:
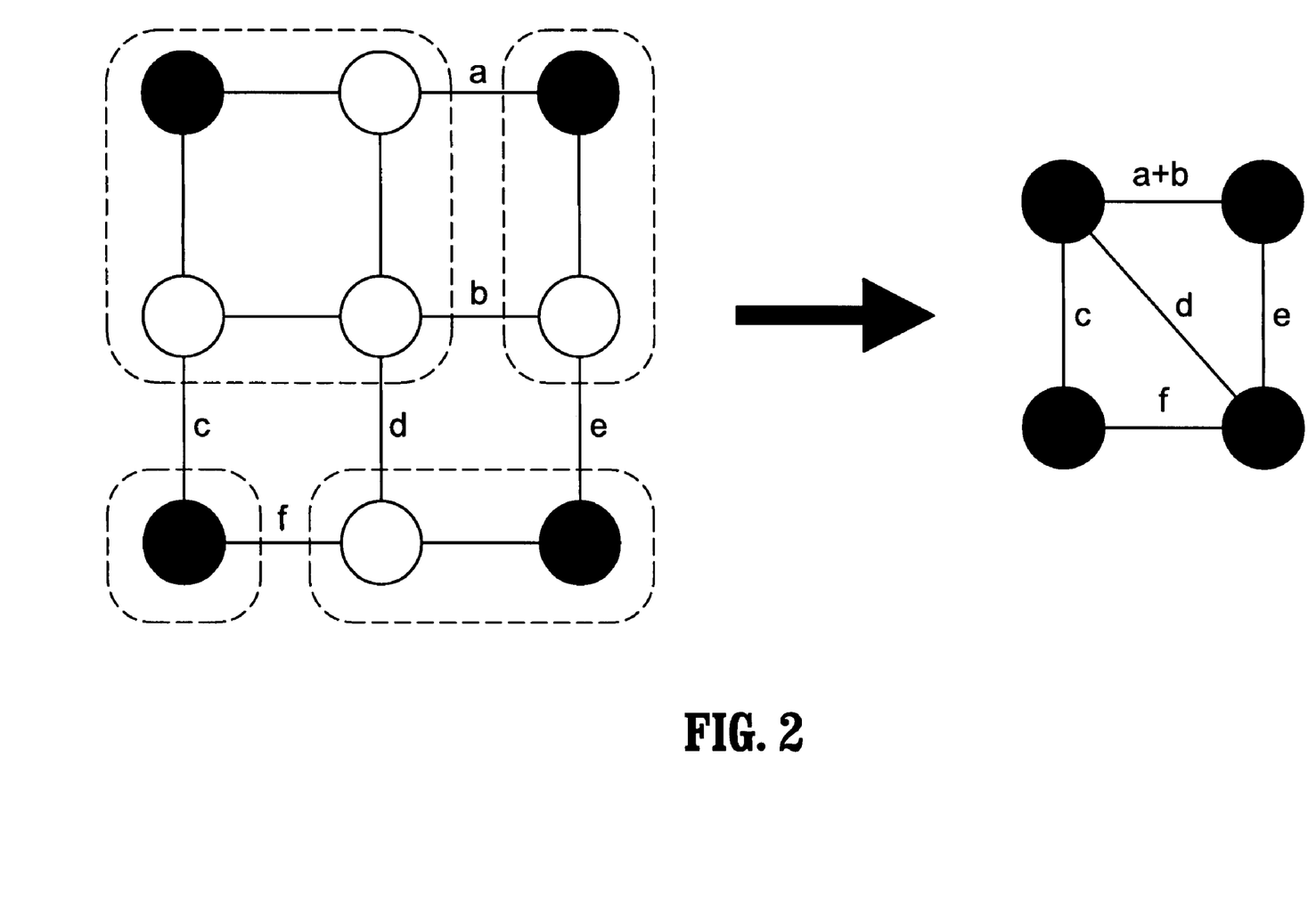
FIG. 2 illustrates coarsening weights from a fine lattice to a coarse lattice, according to an embodiment of the invention.

FIG. 2 illustrates coarsening weights from a fine lattice to a coarse lattice, according to an embodiment of the invention. Black circles represent selected coarse nodes while open circles indicate fine-level nodes. Dashed lines show groups of fine-level nodes that have a common maximally connected neighbor. The graph on the right indicates the coarse-level weighting derived from the fine-level MCN groupings on the left. Although a single diagonal edge has been introduced in the coarse-level graph, the coarse-level graphs will become no more than an 8-connected lattice (or a 26-connected lattice in 3D). Weights on internal edges in the MCN grouping have no influence on the coarse-level weighting and are therefore unlabeled to avoid confusion.

The weight between two coarse nodes may be nonzero only if there exist two nodes, $v_i$ and $v_j$, such that $M^*(v_i) \gamma M^*(v_j)$. A $k^{th}$ order neighbor may be mapped to a set of $2^k$ coarse nodes through $M^*(v_i)$. Given two neighboring nodes, $v_i$ and $v_j$, of $k^{th}$ and $(k-1)^{th}$ order respectively, then $R(v_j)\_R(v_i)$. Therefore, opposite corners of a $(k-1)^{th}$ neighborhood may become connected with nonzero weights, corresponding to 8-connectivity in 2D and 26-connectivity in 3D, as illustrated in FIG. 2. A seed on the fine level, $v_i$, induces a seed on the coarse node $M^*(v_i)$ with the same value (i.e., foreground or background). If two nodes, $v_i$, $v_j$, are seeds with opposite value (i.e., one seed represents foreground and the other background) and $M^*(v_i)=M^*(v_j)$, then the assumptions are violated for that coarsening and the lattice should no longer be coarsened.

Thus, using an MCN coarsening, object boundaries can be represented exactly, given a weak shape assumption on the segmentation target. In addition, the coarse level operator is guaranteed to be an 8-connected lattice in 2D and a 27-connected lattice in 3D (even with multiple levels). Therefore, given the above agglomerative operator, an approach according to an embodiment of the invention uses an MCN coarsening operator to define the restriction, prolongation and coarse-level operator, where the principled restriction operator is the adjoint of the MCN prolongation operator P, and a coarse-level system is given by $P^T L P x^C = P^T b^C$ to perform a multigrid method to solve the inhomogeneous Dirichlet/Poisson equations required in the applications mentioned above.

To facilitate ease of coding, computation and theoretical correctness, in an embodiment of the invention it was chosen not to set any of the nodes as boundary nodes directly, but instead to set a phantom node as the desired boundary condition and attach the phantom node to the desired real node with a strong weight. For example, instead of setting node $v_i=1$, the initial linear system $Lx^f=b^f$ can be modified such that $L_{ii}=L_{ii}+\text{LARGE VALUE}$ and $b_i=b_i+\text{LARGE VALUE}$. At higher levels, this approach has the affect of possibly attaching agglomerated nodes to several phantom boundary nodes, thereby circumventing any difficulty of deciding which boundary to impose at higher levels.

Figure 4:
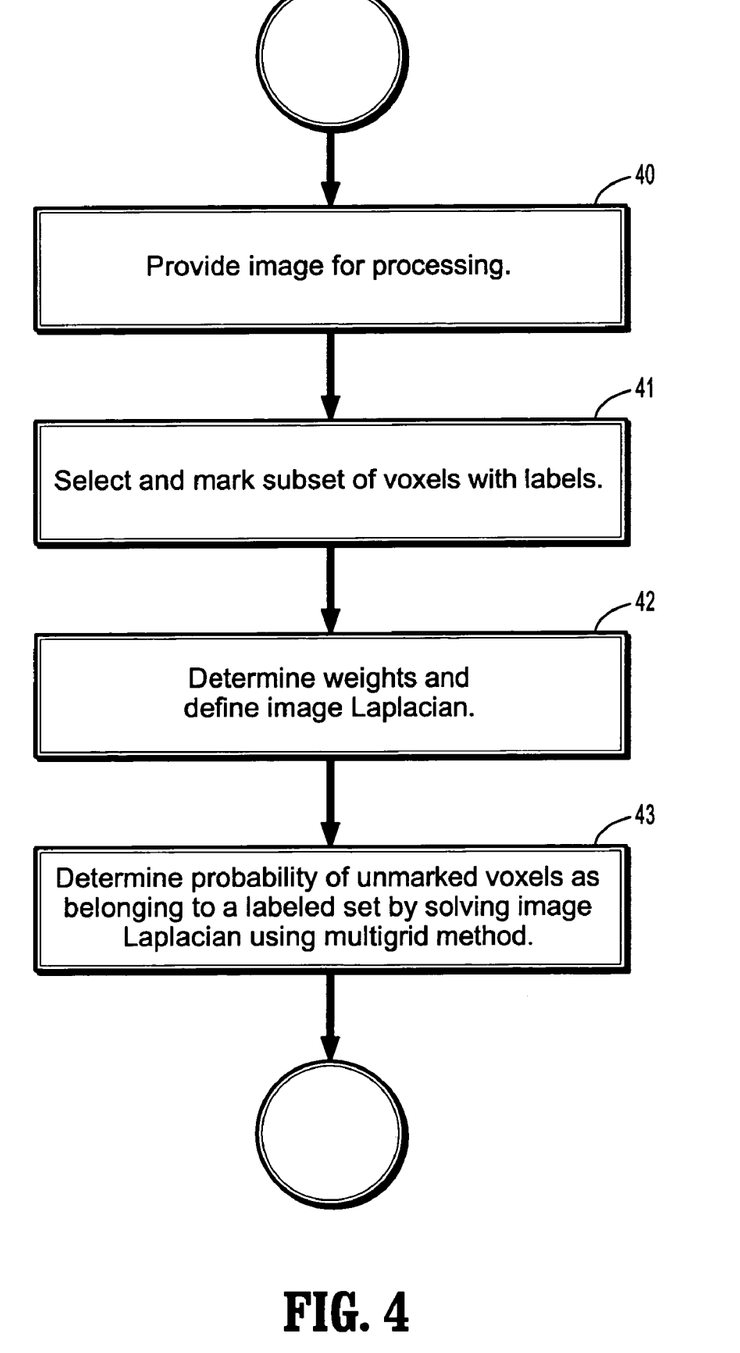
FIG. 4 depicts a flow chart of a lattice-preserving multigrid solver according to an embodiment of the invention.

A flow chart of a lattice-preserving multigrid solver according to an embodiment of the invention is depicted in FIG. 4. Referring now to the figure, an image is provided to be segmented at step 40. The process begins at step 41 by selecting a subset of voxels and labeling these voxels. Each selected voxel is marked and labeled with one of a plurality of labels. In an exemplary embodiment of the invention, there are two labels, one for a foreground object to be segmented, and one for the background. Weights are defined for each pair of adjacent voxels at step 42, and a Laplacian matrix is defined for the image from these weights. The Laplacian system is solved at step 43 using a multigrid method to determine the probability for each unmarked point as belonging to a set indicated by one of the plurality of labels. The prolongation and restriction operators of the multigrid method are defined according to the MCN criteria discussed above, and the fine level segmentation is required to be a prolongation of the coarse level segmentation.

Experimental Validation

Figure 3:
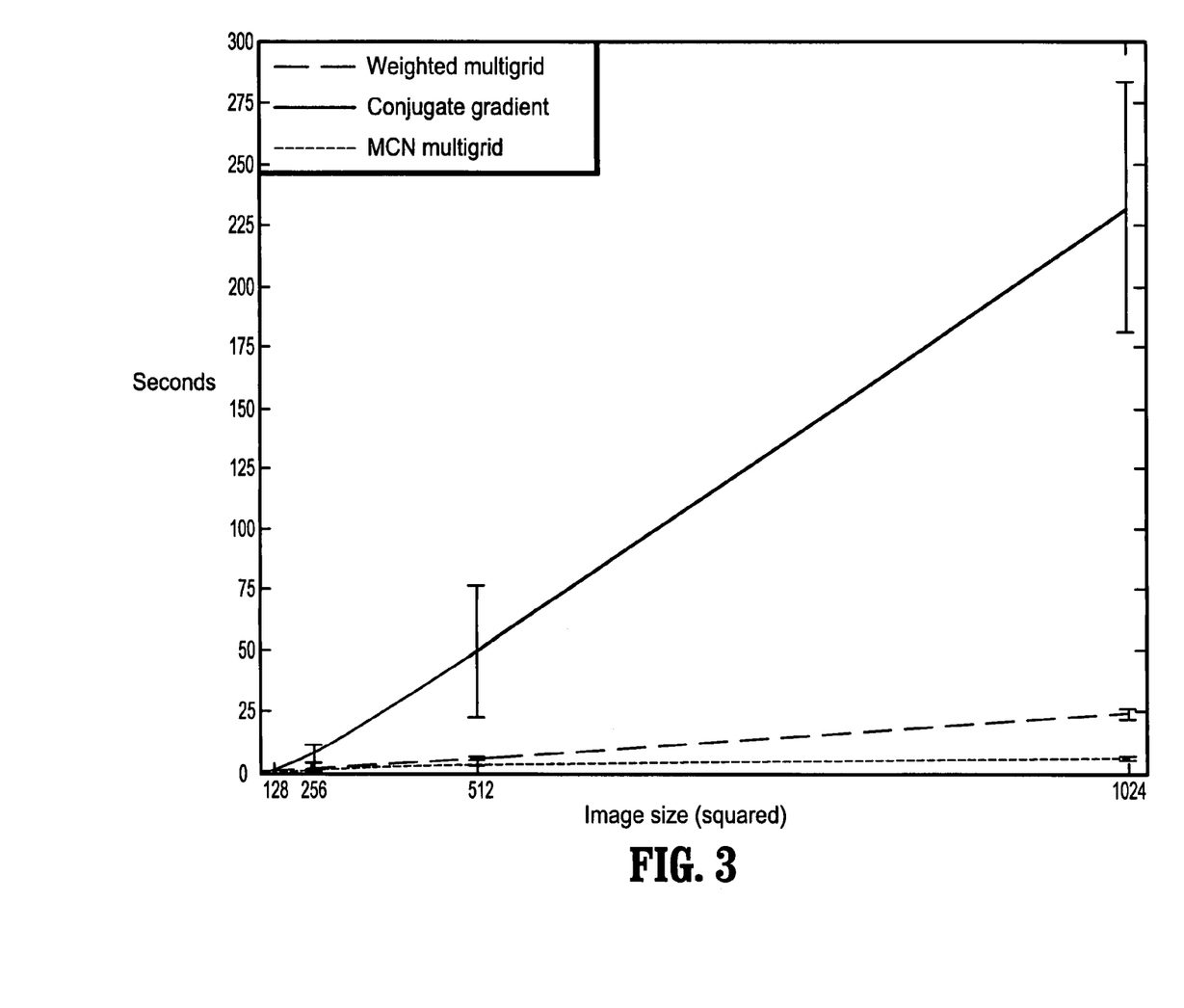
FIG. 3 depicts a comparison of a conjugate gradient method to a multigrid method according to an embodiment for the invention for solving a graph Laplacian when segmenting images.

FIG. 3 illustrates a comparison of multigrid approach according to an embodiment of the invention for solving the linear system $Lx^f=b^f$ to a conjugate gradients method using a modified incomplete Cholesky preconditioner and a weighted multigrid method on 2D images of increasing size. All images were square, with the length of one side given by the x-axis, and the computation time given by the y-axis. While both multigrid approaches significantly outperform the conjugate gradients approach, the MCN multigrid is faster than the weighted multigrid method by a factor of approximately five. In addition, it was found that the solution computed via the MCN method was more accurate and stable than the solution computed using the weighted multigrid approach. Informal tests that compare the MCN multigrid to the conjugate gradient-based method on 3D data also find a speed increase of one to two orders of magnitude.

Implementation

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 5:
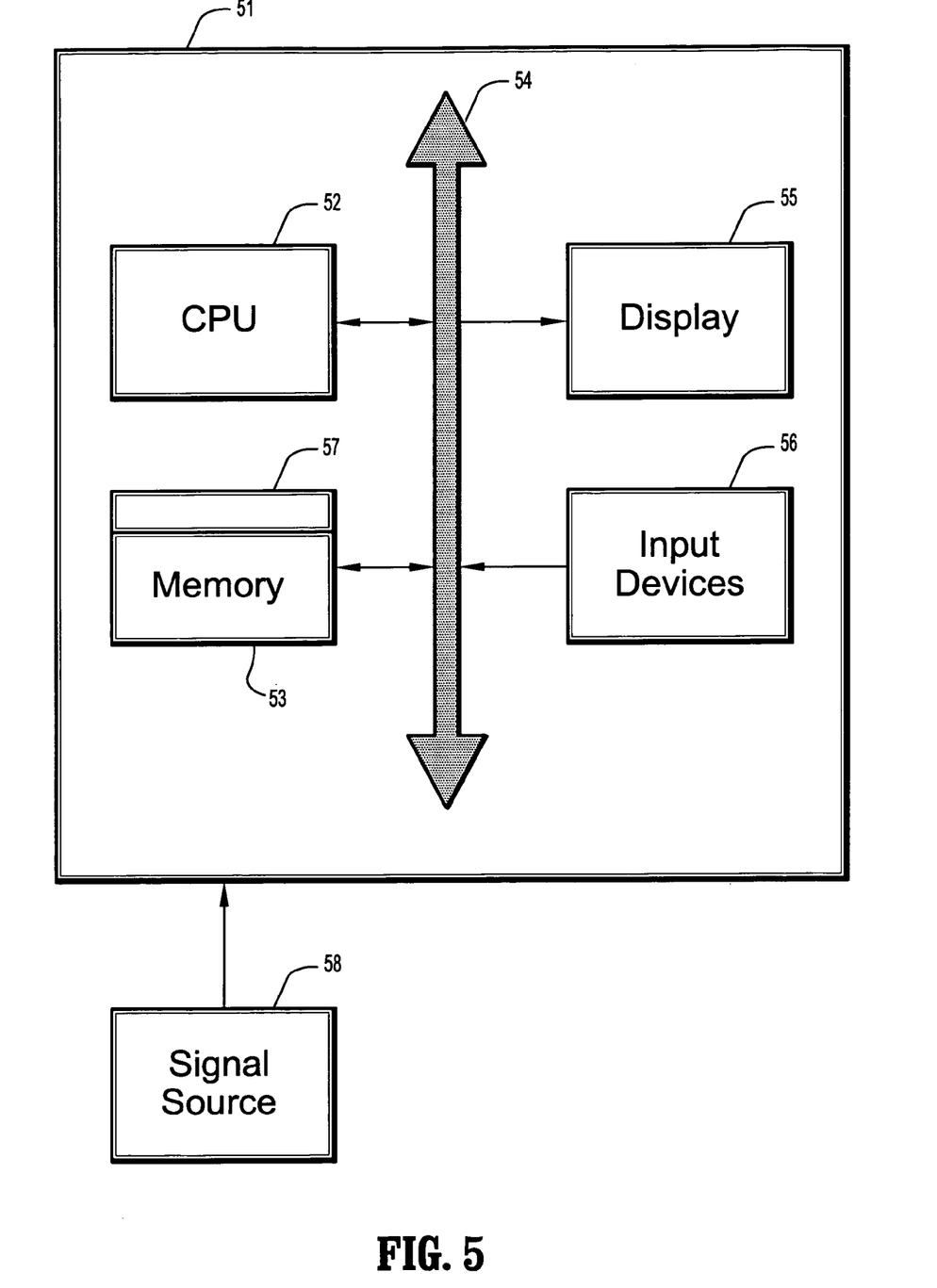
FIG. 5 is a block diagram of an exemplary computer system for implementing a lattice-preserving multigrid scheme according to an embodiment of the invention.

FIG. 5 is a block diagram of an exemplary computer system for implementing a lattice-preserving multigrid solver to the inhomogeneous Laplace equation according to an embodiment of the invention. Referring now to FIG. 5, a computer system 51 for implementing the present invention can comprise, inter alia, a central processing unit (CPU) 52, a memory 53 and an input/output (I/O) interface 54. The computer system 51 is generally coupled through the I/O interface 54 to a display 55 and various input devices 56 such as a mouse and a keyboard. The support circuits can include circuits such as cache, power supplies, clock circuits, and a communication bus. The memory 53 can include random access memory (RAM), read only memory (ROM), disk drive, tape drive, etc., or a combinations thereof. The present invention can be implemented as a routine 57 that is stored in memory 53 and executed by the CPU 52 to process the signal from the signal source 58. As such, the computer system 51 is a general purpose computer system that becomes a specific purpose computer system when executing the routine 57 of the present invention.

The computer system 51 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A computer implemented method of segmenting a digitized image, comprising the steps of:
   providing a digitized image comprising a plurality of intensities corresponding to a domain of points on an N-dimensional grid;
   defining a weight between each pair of adjacent points in the image based on the intensity difference of each said point pair;
   marking a subset of points in said image wherein each marked point is marked with one of a plurality of labels;
   determining the probability that an unmarked point should be marked with one of said plurality of labels using a multigrid method that uses a restriction operator to map said provided image to a coarse-level grid, and a prolongation operator to map said coarse-level image back to a fine-level grid, wherein said restriction operator is an adjoint of said prolongation operator, and wherein a fine-level segmentation is a prolongation of a coarse level segmentation, wherein an unmarked point is marked with a label having a highest probability, wherein said image is segmented by the labels that mark each point, and
   wherein said steps of defining a weight, marking a subset of points, and determining the probability are performed by a computer processor.

2. The method of claim 1, wherein said prolongation operator is $$P_{v_i c_j} = \begin{cases} 1, & \text{if } v_i = c_j, \\ 1, & \text{if } c_j \text{ is the MCN } v_i, \\ 0, & \text{otherwise.} \end{cases}$$

wherein $v_i$ is a point on said image, $c_j$ is a point on said coarse level grid image, and a most strongly connected neighbor of a point is an adjacent point having a largest weight between said pair of points.

3. The method of claim 1, wherein said multigrid method comprises calculating an approximate solution to said probabilities on a fine level grid starting from said provided image, calculating a residual to the solution, restricting the residual to said coarse level grid with said restriction operator, calculating a correction for the residual on the coarse level grid, and correcting the approximate solution on said fine level grid with a prolongated correction using said prolongation operator.

4. The method of claim 1, further comprising representing said image by a Laplacian matrix L indexed by point pairs, wherein an element $L_{ij}$ for points i and j is defined by $$L_{ij} = \begin{cases} d_i, & \text{if } i = j, \\ -w_{ij}, & \text{if } i \text{ and } j \text{ represent adjacent nodes}, \\ 0, & \text{otherwise}, \end{cases}$$

wherein $w_{ij}$ is said weight associated with adjacent pairs of points and $d_i = \Sigma w_{ij}$ for all weights incident on point i, decomposing L as $$L = \begin{bmatrix} L_M & B \\ B^T & L_U \end{bmatrix},$$

wherein $L_M$ is the Laplacian for the marked points, $L_U$ is the Laplacian for the unmarked points, and B comprises those elements of L that are left over, representing the probability for each unmarked point i with respect to a marked point s by $x_i^s$, said unmarked probabilities forming a vector $x_U$, wherein the probabilities for each unmarked point can be determined by solving $L_U x_U = b$, wherein b is a function.

5. The method of claim 1, wherein each said weight $w_{ij}$ between a point $v_i$ adjacent to point $v_j$ on a fine level grid is determined by $$w_{ij} = \exp(-\beta(g_i - g_j)^2),$$

where $g_i$ and $g_j$ are the intensities of points i and j, respectively, and β is a free parameter.

6. The method of claim 1, wherein said weight between two adjacent coarse nodes $v_i$, $v_j$, on a coarse level grid includes a term proportional to $$w_{ij} = \sum_{M^*(v_s)=v_i, M^*(v_q)=v_j, \forall v_s, v_j} w_{sq}$$

wherein $w_{sq}$ is the weight between fine level grid points $v_s$, $v_q$, the operator $$M*(v_i \in N^k) = v_j \in N^0$$

produces a coarse node from k applications of operator $$M(v_i \in N^k) = v_j \in N^{k-1}$$

that maps each neighbor point in $N^k$ to its maximally connected neighbor point, and wherein $N^k$ is a set of points wherein a number of odd digits in a coordinate of each said point is equal to k and $N^0$ is the coarse level grid.

7. The method of claim 4, wherein said probability that an unmarked point is be marked with one of said plurality of labels is determined by an initial linear system $$Lx^f = b^f,$$

wherein L is a Laplacian matrix with a fine-level probability solution, $x^f$ and fine-level grid function $b^f$, and said coarse level grid linear system is $$P^T L P x^c = P^T b^c,$$

wherein P is a prolongation operator, $P^T$ is a restriction operator, and $x^c$ and $b^c$ are coarse level probability solutions and functions.

8. The method of claim 1, wherein coarsening said image with said restriction operator further comprises assigning each $k^{th}$-order neighbor of a point in an object to be segmented the same label on a fine-level grid as its most strongly connected $(k-1)^{th}$-order neighbor point, and assigning a $k^{th}$-order neighbor of a point in an object to be segmented that is equally connected to multiple $(k-1)^{th}$-order neighbors the label of any one of these neighbors, wherein a point belongs to a $k^{th}$ order set if a number of odd digits in its coordinates are equal to k.

9. A computer implemented method of segmenting a digitized image, comprising the steps of:
providing a digitized image comprising a plurality of intensities corresponding to a domain of points on an N-dimensional grid;
marking a subset of points in said image wherein each marked point is marked with one of a plurality of labels;
determining the probability that an unmarked point should be marked with one of said plurality of labels solving a linear system $$Lx^f = b^f,$$

using a multigrid method wherein L is a Laplacian matrix representing said image with a probability solution $x^f$ for said provided image and grid function $b^f$, and a coarse level grid linear system is $$P^T LP x^C = P^T b^C,$$

wherein P is a prolongation operator, $P^T$ is a restriction operator, and $x^c$ and $b^c$ are coarse level probability solutions and functions, wherein an unmarked point is marked with a label having a highest probability, wherein said image is segmented by the labels that mark each point, and
wherein said steps of marking a subset of points, and determining the probability are performed by a computer processor.

10. The method of claim 9, wherein said multigrid method uses said restriction operator to map said provided image to said coarse-level gird, and said prolongation operator to map said coarse-level image back to a fine-level grid, wherein said restriction operator is an adjoint of said prolongation operator, and wherein a fine-level segmentation is a prolongation of a coarse level segmentation.

11. The method of claim 9, wherein said Laplacian matrix L that represents said image is indexed by point pairs, wherein an element $L_{ij}$ for points i and j is defined by $$L_{ij} = \begin{cases} d_i, & \text{if } i = j, \\ -w_{ij}, & \text{if } i \text{ and } j \text{ represent adjacent nodes}, \\ 0, & \text{otherwise}, \end{cases}$$

wherein $w_{ij}$ is a weight associated with adjacent pairs of points, said weight based on the intensity difference of each said point pair, and $d_i = \Sigma w_{ij}$ for all weights incident on point i, decomposing L as $$L = \begin{bmatrix} L_M & B \\ B^T & L_U \end{bmatrix},$$

wherein $L_M$ is the Laplacian for the marked points, $L_U$ is the Laplacian for the unmarked points, and B comprises those elements of L that are left over, representing the probability for each unmarked point i with respect to a marked point s by $x_i^s$, said unmarked probabilities forming a vector $x_U$, wherein the probabilities for each unmarked point can be determined by solving $L_U x_U = b$, wherein b is a function.

12. A program storage device readable by a computer, tangibly embodying a program of instructions executable by the computer to perform the method steps for segmenting a digitized image, comprising the steps of:
providing a digitized image comprising a plurality of intensities corresponding to a domain of points on an N-dimensional grid;
defining a weight between each pair of adjacent points in the image based on the intensity difference of each said point pair;
marking a subset of points in said image wherein each marked point is marked with one of a plurality of labels;
determining the probability that an unmarked point should be marked with one of said plurality of labels using a multigrid method that uses a restriction operator to map said provided image to a coarse-level grid, and a prolongation operator to map said coarse-level image back to a fine-level grid, wherein said restriction operator is an adjoint of said prolongation operator, and wherein a fine-level segmentation is a prolongation of a coarse level segmentation.

13. The computer readable program storage device of claim 12, wherein said prolongation operator is $$P_{v_i c_j} = \begin{cases} 1, & \text{if } v_i = c_j, \\ 1, & \text{if } c_j \text{ is the MCN } v_i, \\ 0, & \text{otherwise}. \end{cases}$$

wherein $v_i$ is a point on said image, $c_i$ is a point on said coarse level grid image, and a most strongly connected neighbor of a point is an adjacent point having a largest weight between said pair of points.

14. The computer readable program storage device of claim 12, wherein said multigrid method comprises calculating an approximate solution to said probabilities on a fine level grid starting from said provided image, calculating a residual to the solution, restricting the residual to said coarse level grid with said restriction operator, calculating a correction for the residual on the coarse level grid, and correcting the approximate solution on said fine level grid with a prolongated correction using said prolongation operator.

15. The computer readable program storage device of claim 12, the method further comprising representing said image by a Laplacian matrix L indexed by point pairs, wherein an element $L_{ij}$ for points i and j is defined by $$L_{ij} = \begin{cases} d_i, & \text{if } i = j, \\ -w_{ij}, & \text{if } i \text{ and } j \text{ represent adjacent nodes}, \\ 0, & \text{otherwise}, \end{cases}$$

wherein $w_{ij}$ is said weight associated with adjacent pairs of points and $d_i = \Sigma w_{ij}$ for all weights incident on point i, decomposing L as $$L = \begin{bmatrix} L_M & B \\ B^T & L_U \end{bmatrix},$$

wherein $L_M$ is the Laplacian for the marked points, $L_U$ is the Laplacian for the unmarked points, and B comprises those elements of L that are left over, representing the probability for each unmarked point i with respect to a marked points by $x_i^s$, said unmarked probabilities forming a vector $x_U$, wherein the probabilities for each unmarked point can be determined by solving $L_U x_U = b$, wherein b is a function.

16. The computer readable program storage device of claim 12, wherein each said weight $w_{ij}$ between a point $v_i$ adjacent to point $v_j$ on a fine level grid is determined by $$w_{ij} = \exp(-\beta(g_i - g_j)^2),$$

where $g_i$ and $g_j$ are the intensities of points i and j, respectively, and $\beta$ is a free parameter.

17. The computer readable program storage device of claim 12, wherein said weight between two adjacent coarse nodes $v_i$, $v_j$, on a coarse level grid includes a term proportional to $$w_{ij} = \sum_{M^*(v_s)=v_i, M^*(v_q)=v_j, \forall v_s, v_j} w_{sq}$$

wherein $w_{sq}$ is the weight between fine level grid points $v_s$, $V_q$, the operator $$M*(v_i \in N^k) = v_j \in N^0$$

produces a coarse node from k applications of operator $$M(v_i \in N^k) = v_j \in N^{k-1}$$

that maps each neighbor point in $N^k$ to its maximally connected neighbor point, and wherein $N^k$ is a set of points wherein a number of odd digits in a coordinate of each said point is equal to k and $N^0$ is the coarse level grid.

18. The computer readable program storage device of claim 15, wherein said probability that an unmarked point is be marked with one of said plurality of labels is determined by an initial linear system $$Lx^f = b^f,$$

wherein L is a Laplacian matrix with a fine-level probability solution, $x^f$ and fine-level grid function $b^f$, and said coarse level grid linear system is $$P^T L P x^c = P^T b^c,$$

wherein P is a prolongation operator, $P^T$ is a restriction operator, and $x^c$ and $b^c$ are coarse level probability solutions and functions.

19. The computer readable program storage device of claim 12, wherein coarsening said image with said restriction operator further comprises assigning each $k^{th}$-order neighbor of a point in an object to be segmented the same label on a fine-level grid as its most strongly connected $(k-1)^{th}$-order neighbor point, and assigning a $k^{th}$-order neighbor of a point in an object to be segmented that is equally connected to multiple $(k-1)^{th}$-order neighbors the label of any one of these neighbors, wherein a point belongs to a $k^{th}$ order set if a number of odd digits in its coordinates are equal to k.

* * * * *